No. 709,028.　　　　　　　　　　　　　　　　　　　　　　Patented Sept. 16, 1902.
J. P. MULRONY.
PLOW.
(Application filed Jan. 23, 1902.)
(No Model.)
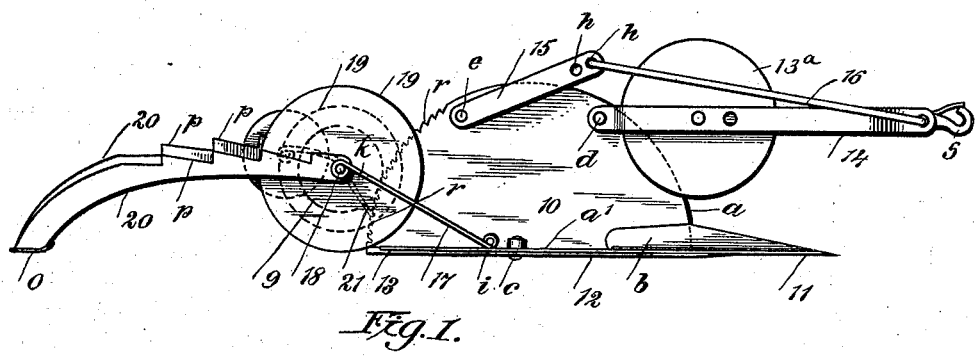
Fig. 1.
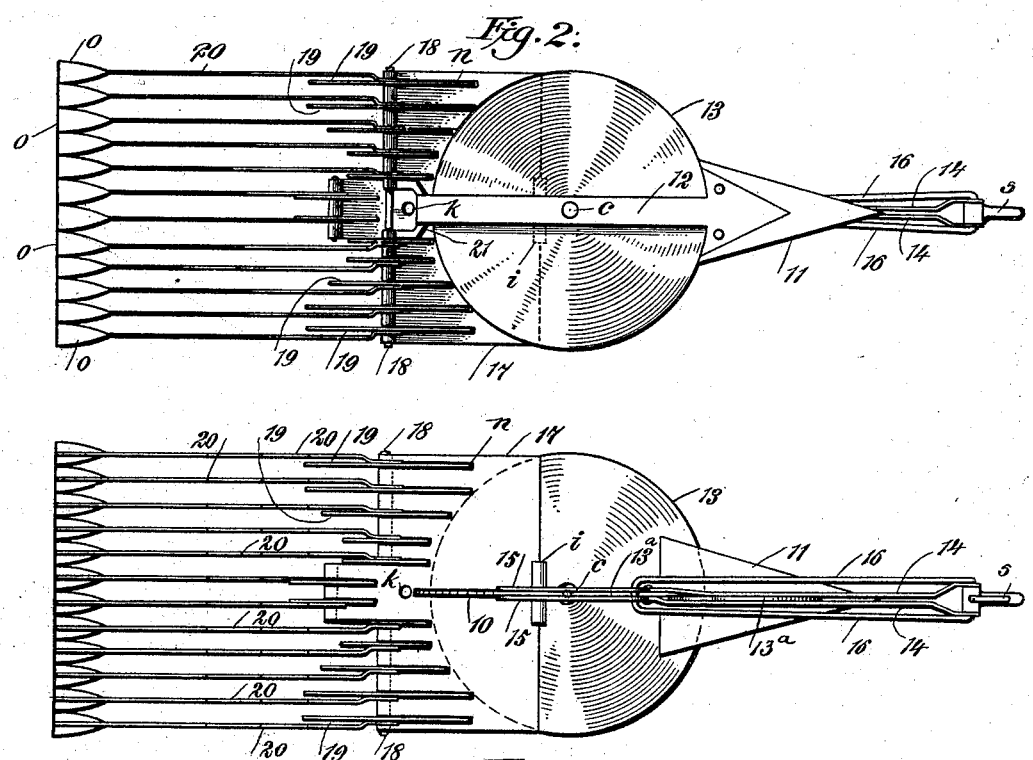
Fig. 2.
Fig. 3.
WITNESSES:
Alfred R. Appleman
Wm. L. Patton
INVENTOR
John P. Mulrony.
BY
ATTORNEYS

UNITED STATES PATENT OFFICE.

JOHN PHILIP MULRONY, OF PLAZA, WASHINGTON.

PLOW.

SPECIFICATION forming part of Letters Patent No. 709,028, dated September 16, 1902.

Application filed January 23, 1902. Serial No. 90,889. (No model.)

*To all whom it may concern:*

Be it known that I, JOHN PHILIP MULRONY, a citizen of the United States, and a resident of Plaza, in the county of Spokane and State of Washington, have invented a new and Improved Plow, of which the following is a full, clear, and exact description.

This invention relates to a class of plows or cultivators having cutters in disk form for loosening the soil and also to sever weeds and the like as the plow is progressively moved.

The object of my invention is to provide a disk plow of novel construction which will very effectively excavate and loosen the soil, separate weeds, roots of plants, and other refuse growths therefrom, depositing the same on the surface of the plowed and pulverized soil.

A further object is to construct the improvement so that it will be adapted to coöperate with any suitable seed-dropping device to be moved in advance or in rear of the improved cultivating-plow and disseminate as well as cover the seed dropped in the plowed ground or on the unplowed ground and at the same time cover the planted soil with mulch formed of weeds or other waste vegetable matter gathered, separated from the pulverized soil, and spread upon the surface of the soil by the improvement.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side view of the improved plow. Fig. 2 is a reversed plan view, and Fig. 3 is a top plan view of the same.

The plow-standard 10 is formed of plate metal and may with advantage be of sheet-steel having sufficient thickness to insure necessary strength and rigidity in service. The standard 10 is preferably semicircular on the main portion of its edge, as represented at $a$ in Fig. 1, this curved portion joining the straight bottom edge $a'$, which gives a lunate form to the complete edge of the standard.

A substantially V-shaped point 11 is provided, which is in the form of an inverted T in cross-section, comprising a thin blade-like cutter erected on a thin plate-base, and from the rear end of the point flanges $b$ are extended, which embrace the forward edge of the standard 10 and are thereto secured by any suitable means, one of said flanges being shown in Fig. 1. From the flanges $b$ and the bottom plate of the point 11 a base-plate 12 extends rearwardly of suitable length, and said base-plate is spaced from the lower edge $a'$ of the standard 10, so as to afford a horizontal slot, wherein the disk cutter 13 is held to rotate by a central pivot-bolt $c$.

On the standard 10 is pivoted the rear end of the beam 14, preferably formed of two similar elongated plate-metal bars, the rear ends of which embrace the forward portion of the standard near its edge at a proper distance above the point 11, a pivot $d$ holding these ends loosely secured on the standard, so that the forward end of the two-part beam may be adjusted for height, as will now be explained. A two-part arm 15 is secured at the rear ends of its two equal half-sections upon the standard 10 at a suitable distance from the two-part beam 14, these half-sections of the arm being oppositely lapped upon the standard near its upper edge and affixed thereto by a cross-bolt or rivet $e$.

The forward end of the arm 15, which projects above the standard 10, has a plurality of spaced perforations $h$ formed transversely therein, and a hook member on the rear end of link-rod 16 may be engaged with either of said perforations.

The link-rod 16 is preferably composed of two integral portions engaging at their bent forward ends within a transverse perforation in the beam 14 and thence extending rearwardly at each side of said beam, as indicated in Figs. 2 and 3.

It will be seen that if the rear end of the link-rod 16 is engaged with a forward perforation $h$ in the arm 15 the beam 14 will be supported about parallel with the base-plate 12 and disk cutter 13. In case the beam is to be raised for effecting a deeper insertion of the plow-point into the soil this can readily be effected by engaging the rear end of the link-rod within a perforation $h$ in the arm 15 rearward of the one at the free end of said arm.

A vertically-disposed disk cutter $13^a$ is pivoted between the two parallel members of the beam 14 and projects in front of the standard 10 and at one side thereof, this disk cutter serving efficiently as a colter for cutting a path through rank weeds or vines and dividing hard soil, so that the plow may be moved forwardly without impediment from such obstacles.

A moldboard 17 in the form of a flat plate is pivoted on the sides of the standard 10, as shown at $i$, and said moldboard has a central slot therein, which receives the standard loosely, as shown in Fig. 3. The moldboard 17 is inclined upwardly and rearwardly from the disk cutter 13, which it equals in width, and upon the upper edge of said moldboard a shaft 18 is secured or may be rotatably mounted, if preferred, the shaft equaling in length the width of the moldboard. A series of spaced slots $n$ extend from the upper edge of the moldboard 17 downwardly therein in parallel planes.

On the shaft 18 and in the slots $n$ are placed a series of cutter-disks 19 equal in number to that of the slots, and these cutter-disks may be graded in diameter, increasing in size from the innermost disks to the outermost ones, as shown in Figs. 2 and 3.

Alongside of each cutter-disk 19 a pulverizer-arm 20 is hung by one end on the transverse shaft 18, said arms, which enter the slots $n$, loosely contacting with the disks and extending from the supporting-shaft 18 rearwardly and curving downwardly, as shown in Fig. 1.

Each of the arms 20 terminates at the lower end in a footpiece $o$, formed of plate metal and extending at each side of the arm, so as to provide sufficient width for proper bearing upon the ground, over which the machine is drawn, and these feet curve up at their forward edges, as shown in Fig. 1. A series of rearwardly-hooking teeth $p$ is formed on each arm 20, said teeth projecting from the upper edge thereof and extending in suitable number from the forward end of the arm rearwardly.

It is to be understood that the peripheral edges of the disk cutter 13 and series of disk cutters 19 are sharp, and all of said cutters are adapted to rotate freely.

For a proper distance from the flat edge of the standard 10 a series of ratchet-teeth $r$ is formed and on the shaft 18 a pawl 21 is hung loosely, the lower transverse edge of the pawl being designed to engage between adjacent teeth $r$, and it will be seen that the pawl 21, by adjustment on the rack composed of the teeth $r$ either higher or lower, will correspondingly elevate or lower the upper edge of the moldboard 17 and the shaft 18, together with the cutter-disks 19 and the pulverizing-arms 20.

At the forward end of the beam 14 a snap-hook $s$ or a clevis is provided for connecting a team of draft-animals with the plow, if it is used separately, or the beam at its front end may be loosely received upon the rear or forward part of a traveling seeder, (not shown,) which may be adapted for dropping more or less seed as it moves over the unplowed ground, leaving the seed on the surface and beneath the moldboard 17 thereof. For this purpose an aperture $k$ is formed in the moldboard 17, so that the seed may pass freely through the moldboard and past the pawl 21 to reach the ground.

In using the improved plow, if it is to coact with a seed-dropping machine of any preferred construction, (not shown,) the seed-dropper being connected to the beam of the plow, as before mentioned, will upon its forward movement progressively actuate the plow. The point 11, from its peculiar construction, is adapted to enter the ground freely, and the adjustment higher or lower of the beam 14 will effect the insertion of the point correspondingly into the soil, and when a proper depth is attained and ground passes over the point upon the cutter-disk 13 its imposed weight will serve to render this disk level and buried a predetermined depth below the surface of the ground. The ground may be covered with stubble, weeds, or the like; but it is intended that the seed to be planted shall be dropped directly in advance of or beneath the moldboard 17 of the plow and scattered or deposited in rows, as may be preferred. The progressive movement of the seeder and plow will cause the soil to be split by the disk cutter $13^a$ and will pass in a bisected layer rearward to the moldboard 17, up which the layer of soil will pass. The ground elevated as a furrow by the inclined flat moldboard 17 comes in contact during its passage thereon with the disk cutters 19, which will be rotated thereby and break the soil into fine fragments, pushing up the roots, &c., out upon the surface, and this pulverizing of the uplifted layer of soil will be furthered by coaction of the pulverizing-arms 20, through which the comminuted soil falls in an even layer, soft and loose and free from roots, weeds, and refuse vegetable matter. The horizontal disk cutter 13, being introduced at a proper depth below the surface of the soil, is in position to cut off roots of weeds, wild vines, and the like, so that this waste vegetation may be raised with the soil that passes over the cutter and up the moldboard. When the weeds or vines, stubble, or the like reach the arms 20, this debris will be passed down over the series of arms and be kept from mixing with the pulverized soil. As the seed that was dropped upon the unplowed ground in advance of the point 11 is carried by the slice of earth cut by the point and the disk cutter 13 up the moldboard 17 it is of course mixed with the pulverized soil that drops down between the arms 20, and is thus planted. The curved form of the forward edges of the feet $o$ on the depending rear ends of the pulverizing-arms 20 adapts said feet to ride easily on the surface of the soft ground, and by reason of the weight of these arms and the soil thereon smooth and pack the soil somewhat, thus bedding the seed and preventing the loosened soil from drying out quickly. As the vegetable waste matter—such as stubble, weeds, or vines—is deposited on the soil immediately rearward of the feet o, this material serves to shield the soil and seed planted therein from the heat of the sun until the seed germinates, and also protects the young plants from sudden changes of temperature. Furthermore, the elements will eventually rot this mulch, and it thus becomes a surface-manure to enrich the soil and contribute to the growth of the crop to be raised from seed planted by the novel mechanism that has been described and which constitutes my invention.

Having thus described my invention, I claim as new and desire to secure by Letters Patent—

1. In a plow, the combination with a plate-like standard and a beam thereon, of a cutter-disk held on the bottom of the standard and forming the share of the plow.

2. In a plow, the combination with a plate-metal standard and an adjustable beam thereon, of a cutter-disk held to rotate on the bottom of the standard and forming the share of the plow, and a cutter-disk on the beam, providing a colter for said plow.

3. In a plow, the combination with a plate-metal standard and an adjustable beam thereon, of a tapered point at the front of the standard, a base-plate held on and spaced from the lower edge of the standard, and a cutter-disk pivoted centrally between the standard and base-plate.

4. In a plow, the combination with a plate-metal standard having a lunate form, the straight edge being at the bottom, a tapered point T-shaped in cross-section, and an adjustable beam extended from the front of the standard, of a base-plate secured on the point and standard, extending rearward and spaced from the lower edge of the said standard, and a cutter-disk centrally pivoted between the base-plate and lower edge of the standard and forming the share of the plow.

5. In a plow, the combination with a standard having lunate form, a beam pivoted at one end at the front of the standard, an arm secured to project forwardly from the standard behind the beam, and an adjustable link-rod engaging the beam and arm, the adjustment of the said rod controlling the elevation or depression of the front end of the standard, of a point on the standard below the beam, and a horizontal cutter-disk held to rotate at the lower edge of the standard.

6. In a plow, the combination with a standard, and a beam extended forwardly therefrom, of a tapered point on the standard below the beam, a horizontal cutter in disk form pivoted at the lower edge of the standard, and means for supporting the moldboard inclined rearward and upward from the standard.

7. In a plow, the combination with a standard and a beam extended forwardly therefrom, of a tapered point on the standard below the beam, a base-plate held on the point and standard and spaced from the lower edge of said standard, a cutter in disk form pivoted between the base-plate and lower edge of the standard, a flat moldboard pivoted on the standard and inclined upwardly and rearwardly therefrom, and means for adjusting the inclination of the moldboard.

8. In a plow, the combination with a plate-metal standard having lunate form, a two-part beam pivoted thereon and extended forwardly, means for adjustably supporting the beam near its front end, and a disk cutter pivoted between members of the beam, of a tapered point on the standard, a base-plate secured on the point and standard, a disk cutter held to rotate between the base-plate and standard, a flat moldboard held to rock on and incline rearwardly and upwardly from the standard, a transverse shaft supported on the moldboard near its upper edge, and a plurality of disk cutters carried by the shaft.

9. In a plow, the combination with a plate-metal standard having lunate form, a beam extended forwardly from the standard, a point on said standard below the beam, and a disk cutter held to rotate in a horizontal plane at the lower edge of the standard, of a plate-metal moldboard having flat sides, means for holding the moldboard free to rock on the standard and inclined upwardly and rearwardly therefrom, a pawl on the moldboard engaging rack-teeth on the standard, a transverse shaft on the upper part of said moldboard, a plurality of disk cutters rotatable on the shaft in slots in the moldboard, and a plurality of pulverizing-arms held to rock on said shaft at the sides of the respective disk cutters.

10. In a plow of the character described, the combination with the plate-metal standard having lunate form, and having a series of teeth at its rear edge, of a moldboard rockably supported on the standard, and a pawl hung from the moldboard and adapted to mesh with the rack-teeth to change the inclination of the moldboard on the standard.

11. In a plow of the character described, the combination with a plate-metal standard, a beam thereon, a tapered point at the lower end of the beam, a horizontal disk cutter pivoted at the lower edge of the standard, and an inclinable flat moldboard projected upward and rearward from the standard, of a shaft carried by the moldboard near its upper edge, said moldboard having slots downwardly extended from the shaft, a series of disk cutters hung on the shaft and entering said slots, and a series of pulverizer-arms hung at one end on said shaft and thence extended rearward and downward, said arms having teeth on their upper edges and feet on their lower ends.

12. In a plow, the following coacting elements: a plate-metal standard, a tapering point thereon, a pivoted and vertically-adjustable beam, a disk cutter pivoted on the beam in a vertical plane, a horizontal disk cutter at the lower edge of the standard, a flat moldboard rockable transversely on the standard and extended rearwardly therefrom, a ratchet-and-pawl device for the inclined adjustment of the moldboard on the standard, a shaft carried at the upper edge of the moldboard, a series of cutter disks mounted on the shaft and working in slots in the moldboard, and a series of pulverizing-arms alternating with the disks on the shaft, said arms extending rearward and downward and each having a widened foot adapted to slide over the ground.

13. In a plow, the combination with a plate-metal standard and a two-part beam thereon, of a disk cutter pivoted between the members of the beam, serving as a colter for the plow.

14. In a plow, the combination with a plate-metal standard, of a two-part beam, a disk cutter pivoted between the members of the beam, a tapered point on the standard, and a horizontal disk cutter pivoted at the lower edge of the standard.

In testimony whereof I have signed my name to this specification in the presence of two subscribing witnesses.

JOHN PHILIP MULRONY.

Witnesses:
M. F. LEWIS,
R. G. PRICHARD.